United States Patent [19]

Papastavros

[11] 4,378,678

[45] Apr. 5, 1983

[54] TURBINE SYSTEM

[76] Inventor: Demos Papastavros, 2429 NE. 184th Ter., North Miami Beach, Fla. 33160

[21] Appl. No.: 395,498

[22] Filed: Jul. 6, 1982

Related U.S. Application Data

[63] Continuation-in-part of Ser. No. 279,765, Jul. 2, 1981, abandoned, which is a continuation-in-part of Ser. No. 104,438, Dec. 17, 1979, abandoned.

[51] Int. Cl.³ .............................................. F01K 23/02
[52] U.S. Cl. ..................................................... 60/655
[58] Field of Search ......................................... 60/655

[56] References Cited

U.S. PATENT DOCUMENTS

| | | | |
|---|---|---|---|
| 3,007,306 | 11/1961 | Martin et al. | 60/655 |
| 3,069,342 | 12/1962 | Flatt | 60/655 X |
| 3,183,666 | 5/1965 | Jackson | 60/39.02 X |
| 3,303,646 | 2/1967 | Southam | 60/655 |
| 3,851,474 | 12/1974 | Heller et al. | 60/655 X |

Primary Examiner—Allen M. Ostrager
Attorney, Agent, or Firm—Oltman and Flynn

[57] ABSTRACT

The present turbine system has two mechanically interconnected turbines, each having a closed loop fluid passageway connecting its outlet to its inlet for recirculating the turbine fluid. The hot exhaust from each turbine heats the inlet fluid to the other turbine in a heat exchanger in the corresponding loop. A cooler is connected to another heat exchanger in each loop to cool the turbine exhaust after it has heated the inlet fluid for the other turbine. A heater is connected in each loop just ahead of the turbine inlet to supply additional heat to the inlet fluid.

7 Claims, 2 Drawing Figures

TURBINE SYSTEM

CROSS-REFERENCE TO RELATED APPLICATIONS

This application is a continuation-in-part of my co-pending U.S. patent application Ser. No. 279,765, filed July 2, 1981 now abandoned, which is a continuation-in-part of my U.S. patent application Ser. No. 104,438, filed Dec. 17, 1979, now abandoned.

SUMMARY OF THE INVENTION

This invention relates to a turbine system having two turbines connected in respective closed loop fluid circuits in which the turbine fluid is recirculated continuously. The two closed loop turbine fluid circuits include heat exchangers in which the hot exhaust from one turbine heats the fluid going to the inlet of the other turbine. Each closed loop turbine fluid circuit also has another heat exchanger in which the exhaust from the corresponding turbine is cooled by fluid which is recirculated through a third closed loop including a cooler. Also, each closed loop turbine fluid circuit has a heater just ahead of the turbine inlet in which the turbine fluid is heated.

A principal object of this invention is to provide a novel turbine system which operates efficiently to minimize the external energy it consumes.

Another object of this invention is to provide a novel turbine system having two turbines which rotate in unison and are connected in separated closed loop fluid circuits in heat exchange relationship to each other, in heat exchange relationship to an externally powered cooler, and in heat exchange relationship to external heat sources.

Another object of this invention is to provide a novel turbine system which does not require any compressor for compressing the turbine fluid ahead of the turbine inlet.

Further objects and advantages of this invention will be apparent from the following detailed description of a presently-preferred embodiment, which is shown schematically in the accompanying drawing.

Figures 1, 2:
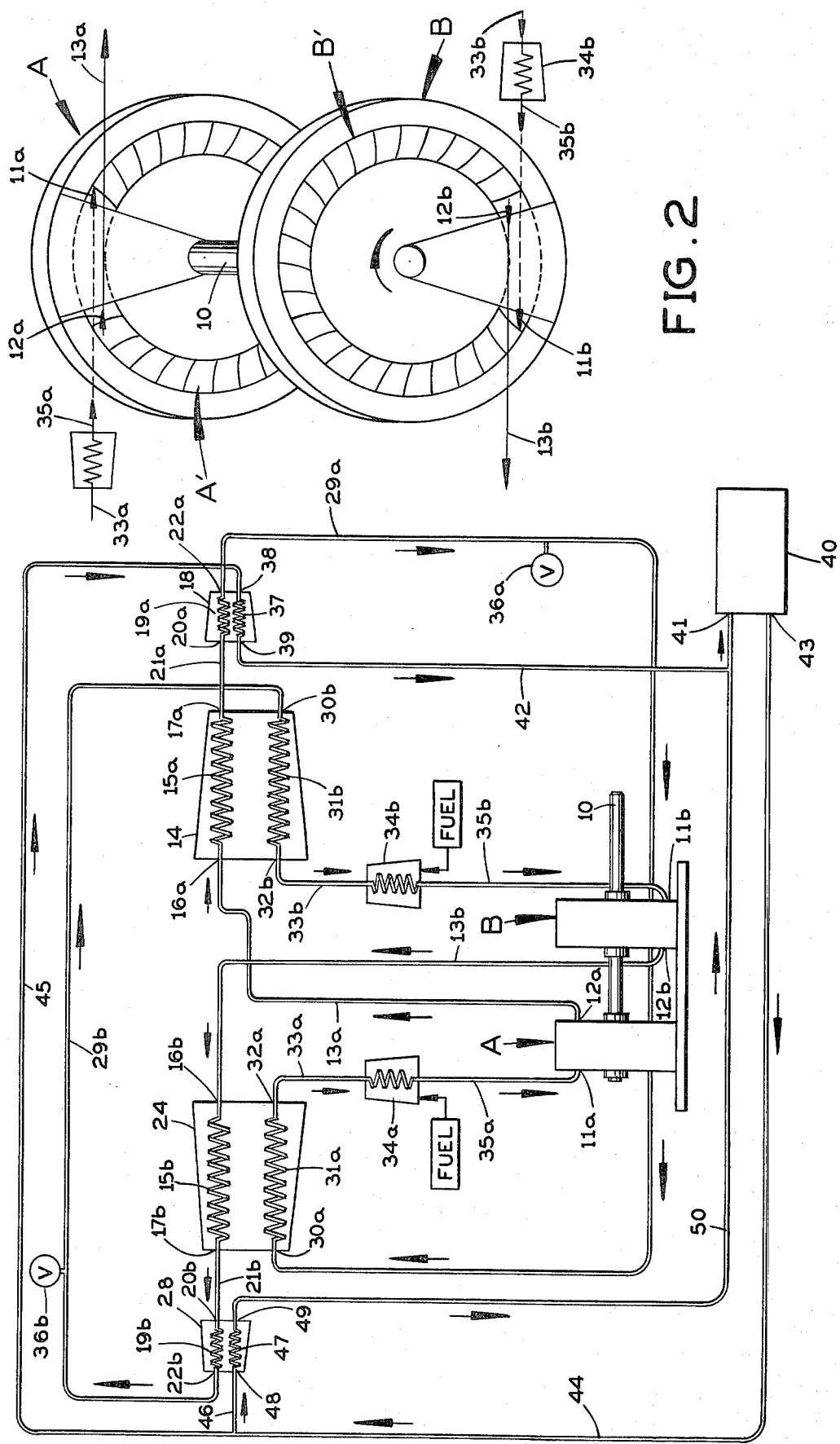
FIG. 1 is a schematic diagram of the present turbine system.
FIG. 2 is a view showing the two turbines schematically in perspective and showing schematically the flow of fluid into and out of each turbine.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

SYSTEM

Referring to FIG. 1, two turbines A and B have their respective rotors mounted on the same rotary shaft 10 so that they rotate in unison.

The first turbine A has a fluid inlet at 11a and a fluid outlet at 12a for passing the hot fluid exhaust from this turbine to a conduit 13a which leads to a first heat exchanger 14. This heat exchanger has a fluid passageway arrangement indicated schematically at 15a with an inlet at 16a at one end connected to conduit 13a and an outlet 17a at the opposite end.

A second heat exchanger 18 has a fluid passageway arrangement indicated schematically at 19a with an inlet 20a, which is connected by a conduit 21a to the outlet 17a from fluid passageway arrangement 15a in the first heat exchanger 14, and an outlet at 22a.

The second turbine B has a fluid inlet at 11b and a fluid outlet at 12b for passing the hot fluid exhaust from this turbine to a conduit 13b which leads to a third heat exchanger 24. This heat exchanger has a fluid passageway arrangement indicated schematically at 15b with an inlet at 16b at one end connected to conduit 13b and an outlet 17b at the opposite end.

A fourth heat exchanger 28 has a fluid passageway arrangement indicated schematically at 19b with an inlet 20b, which is connected by a conduit 21b to the outlet 17b from fluid passageway arrangement 15b in the third heat exchanger 24, and an outlet at 22b.

Referring again to second heat exchanger 18, the outlet 22a of its fluid passageway arrangement 19a is connected by a conduit 29a to the inlet 30a of a second fluid passageway arrangement 31a in the third heat exchanger 24. This second fluid passageway arrangement 31a in heat exchanger 24 passes its fluid in the opposite direction through this heat exchanger from the direction in which the hot discharge from the second turbine B flows through the first passageway arrangement 15b in heat exchanger 24.

The second fluid passageway arrangement 31a in the third heat exchanger 24 has an outlet 32a which is connected to a conduit 33a leading to a selectively operable first heater 34a having a fuel supply (not shown) which may be turned on to raise the temperature of the fluid coming in through conduit 33a, when desired. From this heater the fluid flows through a conduit 35a to the inlet 11a of turbine A.

A valve 36a is connected to conduit 29a to relieve excessive fluid pressure or add fluid pressure from an external source (not shown).

Referring again to the fourth heat exchanger 28, the outlet 22b of its fluid passageway arrangement 19b is connected by a conduit 29b to the inlet 30b of a second fluid passageway arrangement 31b in the first heat exchanger 14. This second fluid passageway arrangement passes its fluid in the opposite direction through heat exchanger 14 from the direction in which the hot discharge from the first turbine A flows through the first passageway arrangement 15a in heat exchanger 14.

The second fluid passageway arrangement 31b in the first heat exchanger 14 has an outlet 32b which is connected to a conduit 33b leading to a selectively operable second heater 34b having a fuel supply (not shown) which may be turned on to raise the temperature of the fluid coming in through conduit 33b, when desired. From heater 34b the fluid flows through a conduit 35b to the inlet 11b of turbine B.

A valve 36b is connected to conduit 29b to vent excessive fluid pressure or add fluid pressure from an external source (not shown).

The second heat exchanger 18 has a second fluid passageway arrangement 37 having an inlet at 38 and an outlet at 39. This second fluid passageway arrangement 37 passes fluid through the second heat exchanger in the opposite direction from the direction in which the first fluid passageway arrangement 19a conducts its fluid.

An externally powered cooler 40 has an inlet 41 connected by a conduit 42 to the outlet 39 of the second heat exchanger 18. The fluid coming in at inlet 41 is cooled in the cooler and then flows through an outlet 43 to a conduit 44. A first branch conduit 45 extends from the opposite end of conduit 44 to the inlet 38 of second heat exchanger 18.

A second branch conduit 46 extends from conduit 44 to the inlet 48 of a second fluid passageway arrangement 47 in the fourth heat exchanger 28. This second fluid passageway arrangement 47 conducts fluid in the opposite direction through the fourth heat exchanger from the direction in which the first fluid passageway arrangement 19b in this heat exchanger conducts its fluid. Fluid passageway arrangement 47 has an outlet 49 connected through a conduit 50 to the inlet 41 of cooler 40.

In each of the four heat exchangers 14, 18, 24 and 28 the two fluid passageway arrangements are arranged to provide heat transfer between the respective fluids which they conduct, so that the fluid which enters at higher temperature gives up some of its heat to the other fluid as the two fluids flow in opposite directions through the heat exchanger. In each heat exchanger, the first and second fluid passageway arrangements are made up of a plurality of parallel passages having the individual passages of the first passageway arrangement between the passages of the second passageway arrangement for effective heat transfer between them.

In the fluid passageway loop for turbine A, conduits 13a, 33a and 35a are of substantially larger diameter than conduits 21a and 29a because the fluid is at a higher temperature in the former. For the same reason in the fluid passageway loop for turbine B, conduits 13b, 33b and 35b are substantially larger in diameter than conduits 21b and 29b.

OPERATION OF SYSTEM

In the operation of this system, the hot fluid exhaust from the first turbine A enters the first passageway arrangement 15a in the first heat exchanger 14 and gives up heat to the turbine B fluid flowing through the second passageway arrangement 31b in heat exchanger 14. After leaving the first heat exchanger 14 through outlet 17a, the turbine A exhaust fluid, its temperature having been reduced in the first heat exchanger, enters the fluid passageway arrangement 19a in the second heat exchanger 18. Here the turbine A fluid gives up heat to the fluid from cooler 40 which flows in the opposite direction through the second fluid passageway arrangement 37 in heat exchanger 18. The turbine A fluid, having been substantially cooled in heat exchanger 18, now flows through conduit 29a to the third heat exchanger 24, where it flows through the second passageway arrangement 31a and absorbs heat before leaving the outlet 32a. The turbine A fluid now flows through heater 34a, in which its temperature may be increased still more, and then it returns to turbine A at its inlet 11a.

The hot fluid exhaust from the second turbine B enters the first passageway arrangement 15b in the third heat exchanger 24 and gives up heat to the turbine A fluid flowing through the second passageway arrangement 31a in heat exchanger 24. After leaving the third heat exchanger 24 through outlet 17b, the turbine B exhaust fluid, its temperature having been reduced in the third heat exchanger, enters the fluid passageway arrangement 19b in the fourth heat exchanger 28. Here, the turbine B fluid gives up heat to the fluid from cooler 40 which flows in the opposite direction through the second fluid passageway arrangement 47 in heat exchanger 28. The turbine B fluid, having been substantially cooled in heat exchanger 28, now flows through conduit 29b to the first heat exchanger 14, where it flows through the second passageway arrangement 31b and absorbs heat before leaving the outlet 32b. The turbine B fluid now flows through heater 34b, in which its temperature may be increased still further, and then it returns to turbine B at its inlet 11b.

Cold fluid from the cooler 40 flows through its outlet 43 in parallel paths to the second and fourth heat exchangers 18 and 28, in which it flows through the second passageway arrangement 37 and 47, respectively, to cool the turbine A and turbine B fluids, respectively. From the heat exchangers 18 and 28 this cooling fluid returns to the inlet 41 of cooler 40.

TUBINES

FIG. 2 shows schematically the two turbines A and B whose vaned rotors A' and B', respectively, are mounted on the same shaft 10.

Fluid from conduit 35a enters turbine A at inlet point 11a, causing the rotor A' to rotate clockwise in FIG. 2. The fluid leaves turbine A at point 12a and from there it flows into outlet conduit 13a. Inlet point 11a is positioned several degrees clockwise from exit point 12a and between these points there is no fluid in turbine A. There is a partial vacuum between these points which draws fluid into turbine A at inlet point 11a.

Similarly, fluid from conduit 35b enters turbine B at inlet point 11b, causing rotor B' to rotate clockwise in FIG. 2. The fluid leaves turbine B at point 12b and from there it flows into outlet conduit 13b. Inlet point 11b is positioned several degrees clockwise from exit point 12b and between these points there is no fluid in turbine B. A partial vacuum between these points draws fluid into turbine B at inlet point 11b.

The present system does not require a compressor in the fluid supply line for either turbine. Instead, the present system uses heat transfer to insure proper operation of the turbines, with heat being added to each turbine fluid by the heater ahead of the turbine inlet and heat being taken from the turbine exhaust by heat exchangers.

Preferably, turbines A and B are identical, the first and third heat exchangers 14 and 24 are identical. The second and fourth heat exchangers 18 and 28 are identical, so that the same cooling effect is provided on the turbine A fluid as on the turbine B fluid, and the heaters 34a and 34b are identical so that the same amount of thermal energy is added to the fluid in both the turbine A loop and the turbine B loop. With such an arrangement the fluid pressure at the inlet 11a of turbine A is equal to the fluid pressure at the inlet 11b of turbine B, and the fluid pressure at the outlet 12a of turbine A is equal to the fluid pressure at the outlet 12b of turbine B. The fluid conduits in the loop for turbine A are the same size as the correspondingly numbered conduits in the loop for turbine B. At corresponding points in the respective loops for turbines A and B the fluid pressures and velocities are equal.

I claim:
1. In a turbine system having:
first and second turbines having their respective rotors coupled to each other for rotation in unison with each other, each of said tubines having a fluid inlet and a fluid outlet;
first, second, third and fourth heat exchangers each having a first fluid passageway arrangement having opposite ends and a second fluid passageway arrangement having opposite ends, said first and second fluid passageway arrangements in each heat exchanger being in heat transfer relationship to one another;

fluid conduit means operatively connecting the output of said first turbine to one end of said first fluid passageway arrangement in said first heat exchanger;

and fluid conduit means operatively connecting the output of said second turbine to one end of said first fluid passageway arrangement in said third heat exchanger;

the improvement which comprises the combination of:

fluid conduit means operatively connecting the opposite end of said first fluid passageway arrangement in said first heat exchanger to one end of said first fluid passageway arrangement in said second heat exchanger;

fluid conduit means operatively connecting the opposite end of said first fluid passageway arrangement in said second heat exchanger to one end of said second fluid passageway arrangement in said third heat exchanger;

fluid conduit means operatively connecting the opposite end of said second fluid passageway arrangement in said third heat exchanger to the inlet of said first turbine;

fluid conduit means operatively connecting the opposite end of said first fluid passageway arrangement in said third heat exchanger to one end of said first fluid passageway arrangement in said fourth heat exchanger;

fluid conduit means operatively connecting the opposite end of said first fluid passageway arrangement in said fourth heat exchanger to one end of said second fluid passageway arrangement in said first heat exchanger;

fluid conduit means operatively connecting the opposite end of said second fluid passageway arrangement in said first heat exchanger to the inlet of said second turbine;

a cooler having a fluid inlet, a fluid outlet, and cooling means between its inlet and outlet for cooling fluid;

fluid conduit means operatively connecting the outlet of said cooler to one end of the second fluid passageway arrangement in said second heat exchanger;

fluid conduit means operatively conecting the opposite end of said second fluid passageway arrangement in said second heat exchanger to the inlet of said cooler;

fluid conduit means operatively connecting the outlet of said cooler to one end of said second fluid passageway arrangement in said fourth heat exchanger;

and fluid conduit means operatively connecting the opposite end of said second fluid passageway arrangement in said fourth heat exchanger to the inlet of said cooler.

2. A turbine system according to claim 1 and further comprising:

means for heating the fluid flowing between said opposite end of said second fluid passageway arrangement in said third heat exchanger and the inlet of said first turbine;

and means for heating the fluid flowing between said opposite end of said second fluid passageway arrangement in said first heat exchanger and the inlet of said second turbine.

3. A turbine system according to claim 1 wherein both turbines have the same fluid at equal inlet pressures and equal outlet pressures.

4. In a turbine system having:

first and second turbines having their respective rotors coupled to each other for rotation in unison with each other, each of said turbines having a fluid inlet and a fluid outlet;

first, second, third and fourth heat exchangers each having a first fluid passageway arrangement having opposite ends and a second fluid passageway arrangement having opposite ends, said first and second fluid passageway arrangements in each heat exchanger being in heat transfer relationship to one another;

fluid conduit means operatively connecting the output of said first turbine to one end of said first fluid passageway arrangement in said first heat exchanger;

and fluid conduit means operatively connecting the output of said second turbine to one end of said first fluid passageway arrangement in said third heat exchanger;

the improvement which comprises the combination of:

fluid conduit means operatively connecting the opposite end of said first fluid passageway arrangement in said first heat exchanger to one end of said first fluid passageway arrangement in said second heat exchanger;

fluid conduit means operatively connecting the opposite end of said first fluid passageway arrangement in said second heat exchanger to one end of said second fluid passageway arrangement in said third heat exchanger;

fluid conduit means operatively connecting the opposite end of said second fluid passageway arrangement in said third heat exchanger to the inlet of said first turbine;

fluid conduit means operatively connecting the opposite end of said first fluid passageway arrangement in said third heat exchanger to one end of said first fluid passageway arrangement in said fourth heat exchanger;

fluid conduit means operatively connecting the opposite end of said first fluid passageway arrangement in said fourth heat exchanger to one end of said second fluid passageway arrangement in said first heat exchanger;

and fluid conduit means operatively connecting the opposite end of said second fluid passageway arrangement in said first heat exchanger to the inlet of said second turbine.

5. A turbine system according to claim 4, and further comprising means operatively connected to said second fluid passageway arrangement in said second heat exchanger for cooling the fluid flowing through said first fluid passageway arrangement in said second exchanger and operatively connected to said second fluid passageway arrangement in said fourth heat exchanger for cooling the fluid flowing through said first fluid passageway arrangement in said fourth heat exchanger.

6. A turbine system according to claim 5, and further comprising:

means for heating the fluid flowing between said opposite end of said second fluid passageway arrangement in said third heat exchanger and the inlet of said first turbine;

and means for heating the fluid flowing between said opposite end of said second fluid passageway arrangement in said first heat exchanger and the inlet of said second turbine.

7. A turbine system according to claim 4, and further comprising:

means for heating the fluid flowing between said opposite end of said second fluid passageway arrangement in said third heat exchanger and the inlet of said first turbine;

and means for heating the fluid flowing between said opposite end of said second fluid passageway arrangement in said first heat exchanger and the inlet of said second turbine.

* * * * *